United States Patent
Yasuda et al.

(10) Patent No.: US 8,984,671 B2
(45) Date of Patent: Mar. 24, 2015

(54) HEAD-MOUNTED DEVICE

(75) Inventors: Toshiyuki Yasuda, Kawasaki (JP);
Takaaki Nakabayashi, Kawasaki (JP);
Toshiki Ishino, Hiratsuka (JP);
Toshiyuki Okuma, Chofu (JP);
Yoshihiro Saito, Hachioji (JP);
Kazuhide Miyata, Yokohama (JP);
Hiroshi Komatsu, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1636 days.

(21) Appl. No.: 12/204,624

(22) Filed: Sep. 4, 2008

(65) Prior Publication Data
US 2009/0066607 A1    Mar. 12, 2009

(30) Foreign Application Priority Data

Sep. 10, 2007 (JP) .................................. 2007-234712

(51) Int. Cl.
*A42B 1/22* (2006.01)
*G02B 27/01* (2006.01)
*H04N 13/04* (2006.01)

(52) U.S. Cl.
CPC .......... *G02B 27/0176* (2013.01); *H04N 13/044* (2013.01); *H04N 2213/001* (2013.01); *H04N 2213/008* (2013.01)
USPC .................................................. 2/417; 2/183

(58) Field of Classification Search
USPC .......... 2/411, 417, 414, 418, 419, 422, 182.2, 2/183, 209.13, 195.2, 424, 6.7, 6.5, 6.2; 345/7–9, 905
See application file for complete search history.

(56) References Cited

U.S. PATENT DOCUMENTS

| | | | |
|---|---|---|---|
| 5,671,037 A | | 9/1997 | Ogasawara |
| 5,767,820 A | * | 6/1998 | Bassett et al. ..................... 345/8 |
| 5,950,245 A | * | 9/1999 | Binduga ........................... 2/417 |
| 6,256,798 B1 | * | 7/2001 | Egolf et al. ...................... 2/421 |
| 6,708,376 B1 | * | 3/2004 | Landry ......................... 24/68 R |
| 7,000,262 B2 | * | 2/2006 | Bielefeld ......................... 2/418 |
| 7,174,575 B1 | * | 2/2007 | Scherer .......................... 2/418 |
| 2005/0138719 A1 | * | 6/2005 | Huh ............................... 2/416 |
| 2005/0247813 A1 | * | 11/2005 | Kovacevich et al. ....... 242/388.6 |
| 2006/0015988 A1 | * | 1/2006 | Philpott et al. ................... 2/410 |
| 2007/0018908 A1 | * | 1/2007 | Nakabayashi et al. .......... 345/8 |
| 2008/0109947 A1 | * | 5/2008 | Dubois ........................... 2/414 |

FOREIGN PATENT DOCUMENTS

JP    7-333547 A    12/1995
JP    8-088814 A    4/1996

* cited by examiner

*Primary Examiner* — Shaun R Hurley
*Assistant Examiner* — Andrew W Sutton
(74) *Attorney, Agent, or Firm* — Canon U.S.A., Inc. IP Division

(57) ABSTRACT

A head-mounted device to be worn on a user's head includes a first pressing member to press, for example, an occipital region, a second pressing member to press, for example, a parietal region, and first and second linear members connected to the first and second pressing members respectively. The first and second linear members are guided so that a change in lengths of the first and second linear members causes the first and second pressing members to move in the first and second directions respectively. An adjustment unit to adjust the lengths of the first and second linear members includes first and second wind-up units connected to a rotational operation member and to wind up the first and second linear members respectively.

15 Claims, 16 Drawing Sheets

HEAD-MOUNTED DEVICE

BACKGROUND OF THE INVENTION

1. Field of the Invention

The present invention relates to mounting mechanism of a head-mounted device.

2. Description of the Related Art

A head-mounted display (HMD) is a device used by mounting on a head. The HMD allows a user to easily view images stereoscopically on a large screen and to move with the HMD on, and thus has become widely used. A mounting mechanism of the HMD fixes the HMD on a head of a user, for example, by fastening a belt member around the head. In another example, a frontal region pressing unit and an occipital region pressing unit are arranged on the HMD, and the HMD is fixed on the head by moving the occipital region pressing unit back and forth to press the HMD thereon. In such mounting mechanisms, a user can take off the HMD by loosening the belt member or by retracting the occipital pressing member.

Further, there is a mounting mechanism in which a parietal region of the head is pressed to support weight of the HMD to prevent the HMD from slipping down due to the weight (refer to Japanese patent Application Laid-Open No. 8-088814).

Moreover, it is favorable for a user to easily wear the HMD while holding a display unit at a position in which images can be correctly recognized. Consequently, Japanese Patent Application Laid-Open No. 7-333547 discusses the mounting mechanism which uses a wire so that a user can easily wear the HMD while gripping the HMD with one hand.

However, the mounting mechanism discussed in Japanese patent Application Laid-Open No. 8-088814 provides adjustment mechanisms for a head circumference pressing unit and for the parietal region pressing unit separately, and operations for wearing the HMD becomes complicated. Further, since there is a plurality of adjustment mechanisms, the device becomes large and heavyweight.

On the other hand, the mounting mechanism discussed in Japanese Patent Application Laid-Open No. 7-333547 does not include a parietal region pressing unit, so that it is necessary to hold the HMD by only a pressing force on the head circumference. Therefore, the pressing force on the head increases to hold the HMD in place even when the head moves, and a user feels uncomfortable when wearing the HMD. Further, a user needs to support the HMD with one hand while adjusting the pressing units, so that there is a lack in stability.

SUMMARY OF THE INVENTION

The present invention is directed to a mounting mechanism of a HMD which can reduce weight of the HMD, allow a user to adjust a plurality of pressing units whose pressing directions are different, and simplify operations for wearing the HMD.

According to an aspect of the present invention, a head-mounted device to be worn on a head of a user includes a first pressing member configured to press a first region of the head from a first direction, a second pressing member configured to press a second region which is different from the first region of the head from a second direction which is different from the first direction, a first linear member connected to the first pressing member, a second linear member connected to the second pressing member, a guiding member configured to guide the first linear member and the second linear member so that a change in lengths of the first linear member and the second linear member causes the first pressing member and the second pressing member to move in the first direction and the second direction respectively, and an adjustment unit configured to adjust the lengths of the first linear member and the second linear member, wherein the adjustment unit includes first and second wind-up units connected to a rotational operation member and configured to wind up the first linear member and the second linear member, and wherein a transmission characteristic of a rotational force from a rotational shaft of the operation member is different between a connection of the first wind-up unit with the rotational shaft and a connection of the second wind-up unit with the rotational shaft.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

First Exemplary Embodiment

Figure 1:
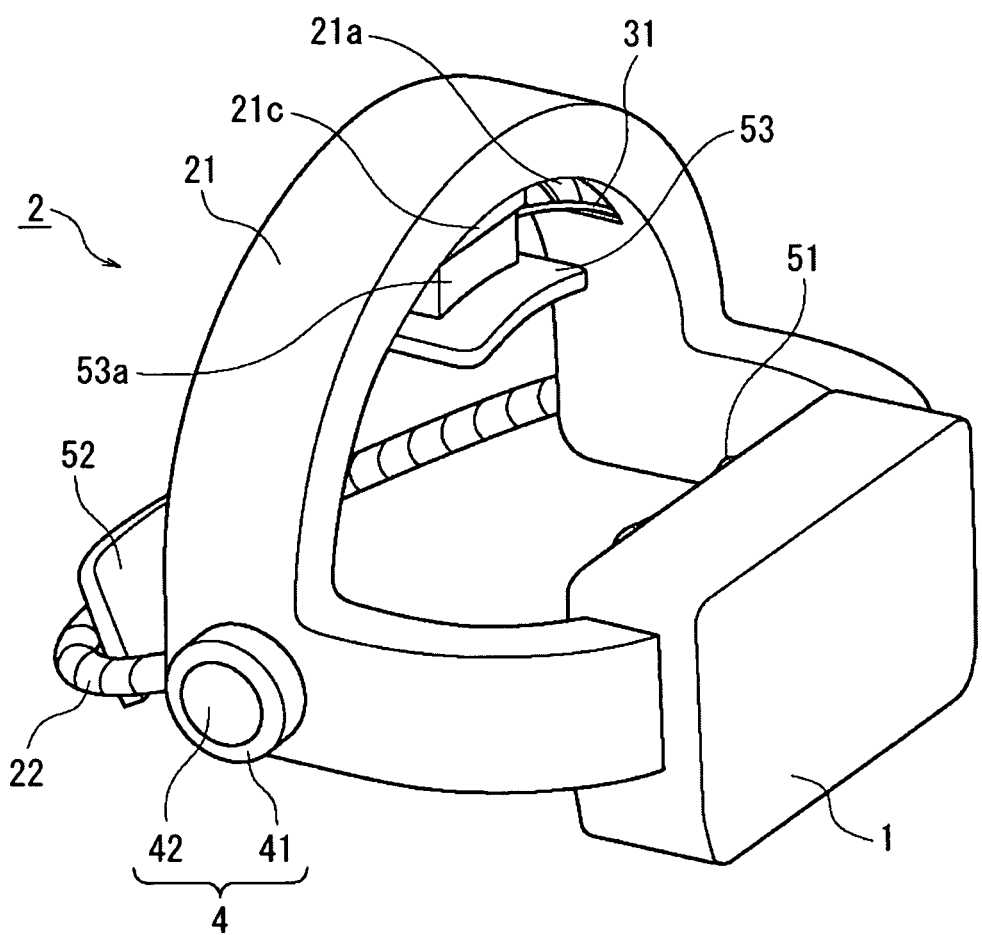
FIG. 1 illustrates a perspective view of an example HMD according to a first exemplary embodiment of the present invention.
Figure 2:
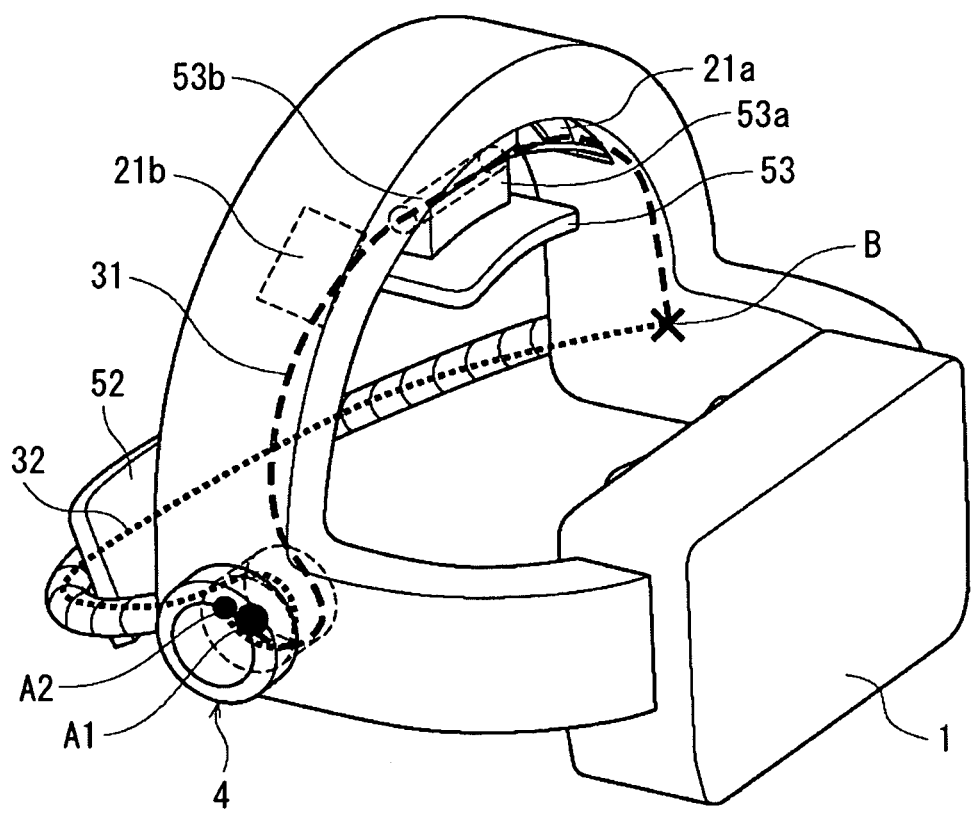
FIG. 2 illustrates a perspective view of the HMD which describes how wires are passed through according to the first exemplary embodiment of the present invention.
Figure 3:
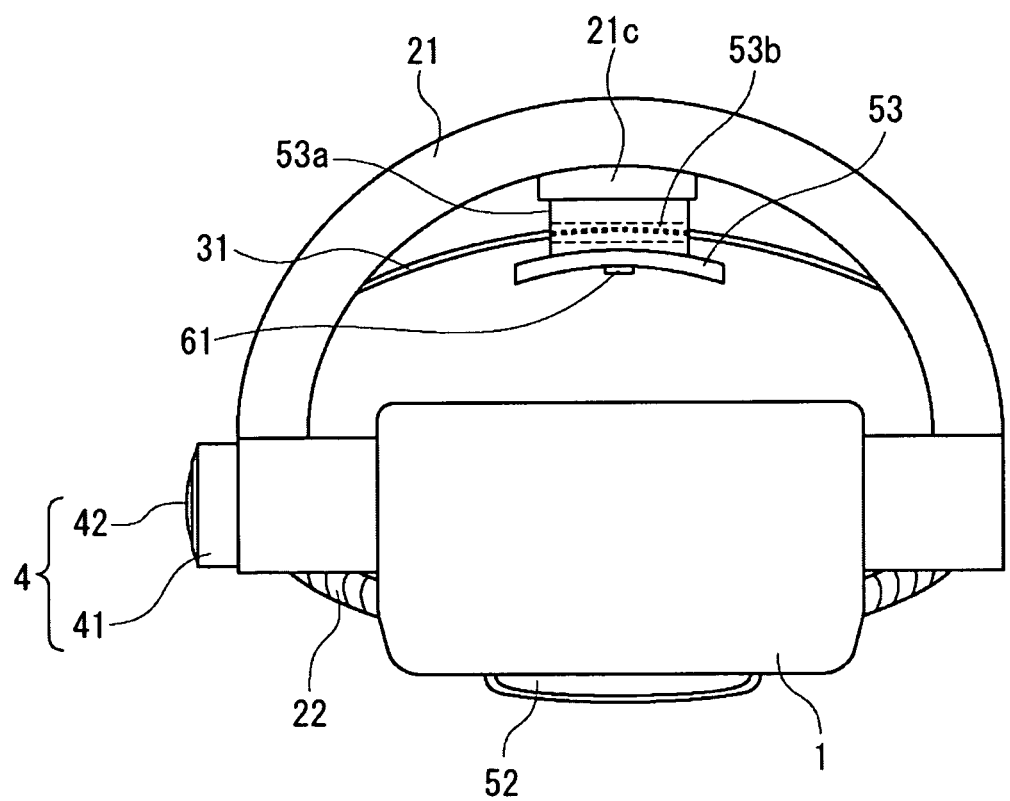
FIG. 3 illustrates an elevation view of the HMD according to the first exemplary embodiment of the present invention.
Figure 4:
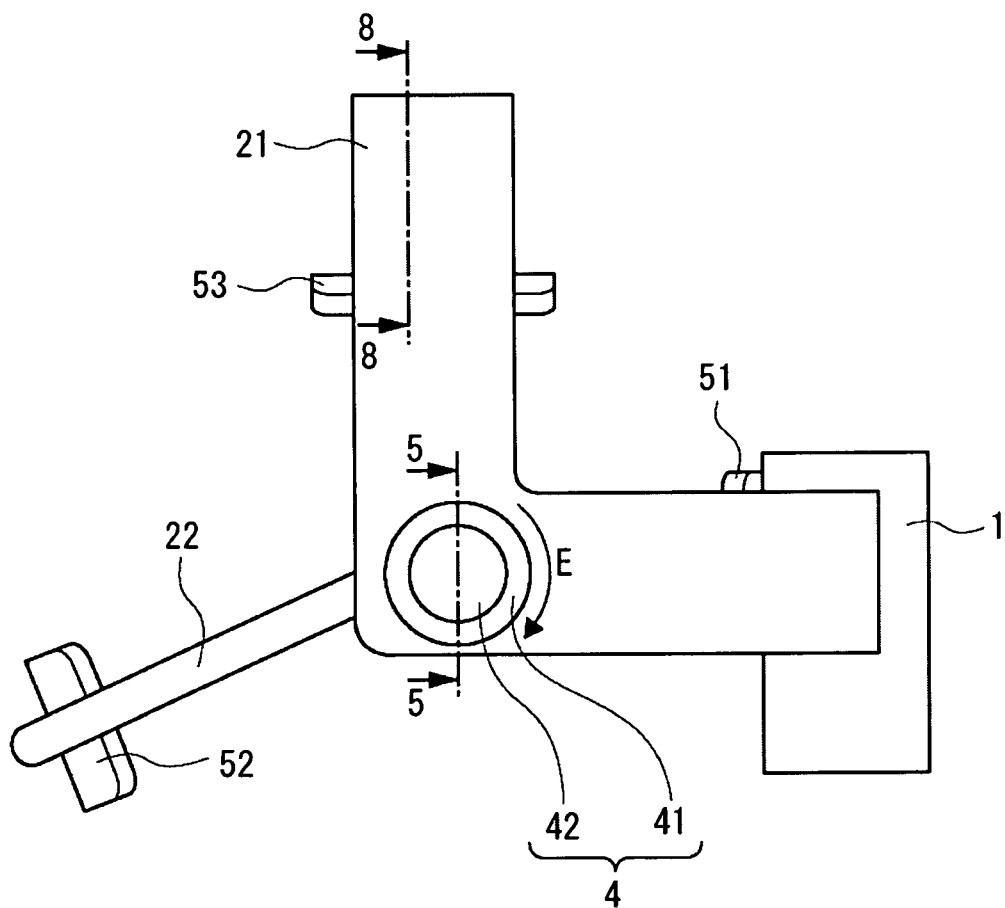
FIG. 4 illustrates a side view of the HMD according to the first exemplary embodiment of the present invention.

FIGS. 1 and 2 illustrate perspective views of an HMD according to a first exemplary embodiment of the present invention. FIG. 3 and FIG. 4 illustrate an elevation view and a side view of the HMD respectively.

The HMD according to the first exemplary embodiment includes a display unit 1 and a mounting unit 2 which holds the display unit 1 in front of eyes of a user. The display unit 1 includes a display element (not illustrated) which internally displays images, and an optical system (not illustrated) which enlarges the images in the display element and guides the images to the eyes of the user.

Further, the display unit 1 is connected to a frame 21 that extends along a head circumference from a right side to a left side by crossing over the parietal region. The frame 21 has a hollow architecture which can realize rigidity and weight saving at the same time. Further, holes 21a and 21b are formed on the parietal region of the frame 21 for running a wire 31 through. In the present invention, the head circumference along the temporal region to the parietal region is referred to as a vertical circumference.

An expansion tube 22 which has a stretchable and accordion-fold form connects the frame 21 from a lateral side to a head side to surround the occipital region. In the present invention, the head circumference along the temporal region to the occipital region is referred to as a horizontal circumference.

FIG. 2 illustrates how the wire 31 and a wire 32 are disposed, and FIG. 3 illustrates an elevation view of the HMD seen from the display unit 1.

Referring to FIG. 2, one end of the wire 31 and one end of the wire 32 are connected to a connecting portion A1 of an adjustment unit 4 that is rotatably fixed on the frame 21. The other ends of the wire 31 and the wire 32 are connected to a connecting portion B on the frame 21. The wire 31 passes from the connecting portion A1 of the adjustment unit 4, through the inside of the frame 21, and comes outside of the frame 21 via the hole 21b. The wire 31 then passes through a through hole 53b formed on a parietal pad guide 53a, re-enters the frame 21 from a hole 21a formed on the frame 21, and is guided to the connecting portion B on the frame 21. On the other hand, the wire 32 passes from a connecting portion A2 on the adjustment unit 4 through the expansion tube 22, and is fastened to the frame 21 at the connecting portion B on the left temporal region of the frame 21.

As illustrated in FIG. 1, a frontal pad 51 which presses a frontal region when a user wears the HMD is attached to the display unit 1. An occipital pad 52 which presses an occipital region when the user wears the HMD is attached to the expansion tube 22. Further, a parietal pad 53 which presses the parietal region when the user wears the HMD is fixed on the frame 21 to be vertically movable (in a direction of pressing the parietal region) with respect to the frame 21. The parietal pad 53 is integrated with the parietal pad guide 53a that is engaged with a guide unit 21c arranged on the frame 21 and controlled to linearly move in a direction of the parietal region. Consequently, a movement of the parietal pad 53 in a direction other than the pressing direction is restrained. Further, as illustrated in FIG. 2, the through hole 53b is formed on the parietal pad guide 53a to pass through the wire 31.

The adjustment unit 4 which adjusts the lengths of the wire 31 and the wire 32 will be described below.

Figure 5:
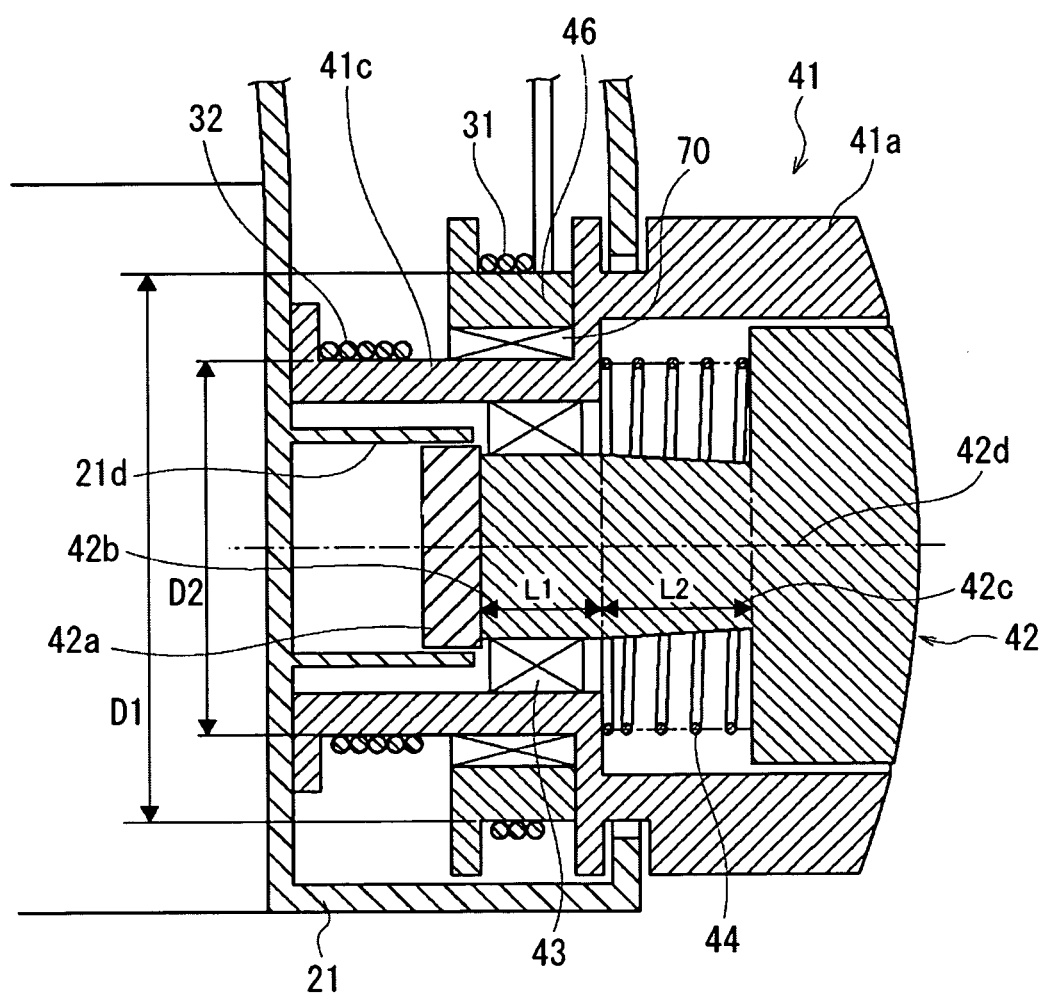
FIG. 5 illustrates a cross-sectional view of the HMD taken along a line 5-5 illustrated in FIG. 4.

FIG. 5 illustrates a cross-sectional view of the adjustment unit 4 taken along the line 5-5 in the side view of the HMD illustrated in FIG. 4. Referring to FIG. 5, the adjustment unit 4 includes an adjustment dial 41, a release button 42, a one-way clutch 43 which is rotatable in only one direction, and a biasing spring 44. A direction of rotation of the adjustment dial 41 is indicated by "E".

The adjustment dial 41 includes a knob unit 41a that a user operates when mounting the HMD, and a wire wind-up unit 41c for winding up the wire 32 inside the frame 21. Further, the wire 31 is wound up by a pulley 46 that is geared with the wire wind-up unit 41c. A torque-sensing torque clutch 70 is coaxially-fitted between the pulley 46 and the wire wind-up unit 41c. Consequently, a slip is generated when a torque between the pulley 46 and the wire wind-up unit 41c becomes greater than or equal to a defined value. However, when the torque is within the defined value, the pulley 46 and the wire wind-up unit 41c are integrally rotated, and a rotational force which is applied to the knob unit 41a is transmitted to the wire wind-up unit 41c. The adjustment dial 41 and the one-way clutch 43 are integrated.

The release button 42 includes a detent key 42a, a shaft 42b (i.e., a range L1 illustrated in FIG. 5) which is axially-fitted with the one-way clutch 43, and a taper unit 42c (i.e., a range L2 illustrated in FIG. 5) for releasing the shaft 42b from the one-way clutch 43 when the release button 42 is pressed. The detent key 42a of the release button 42 is engaged with a detent key groove unit 21d formed on the side of the frame 21. Consequently, the detent key 42a does not rotate with respect to the frame 21, and moves only in a linear direction of a center line 42d illustrated in FIG. 5.

On the other hand, the adjustment dial 41 rotates in only one direction with respect to the release button 42 due to the one-way clutch 43 that is rotatable in only one direction. Accordingly, the adjustment dial 41 is locked to rotate in an opposite direction (hereinafter referred to as a lock state). When a user presses the release button 42, the shaft 42b is released from a fitting portion of the one-way clutch 43, and the taper unit 42c releases the lock (hereinafter referred to as a free state).

The biasing spring 44 which biases the release button 42 in a direction opposite to the release direction is provided between the adjustment dial 41 and the release button 42. Consequently, when the release button 42 is not operated, the shaft 42b is fitted with the one-way clutch 43, and the lock state is maintained. One end of the wire 31 and one end of the wire 32 are connected to the adjustment dial 41 so that the wire 31 and wire 32 are wound up when the adjustment dial 41 is turned in the lock state. More specifically, one end of the wire 31 is connected to the pulley 46, and one end of the wire 32 is connected to the wire wind-up unit 41c.

Figure 6A:
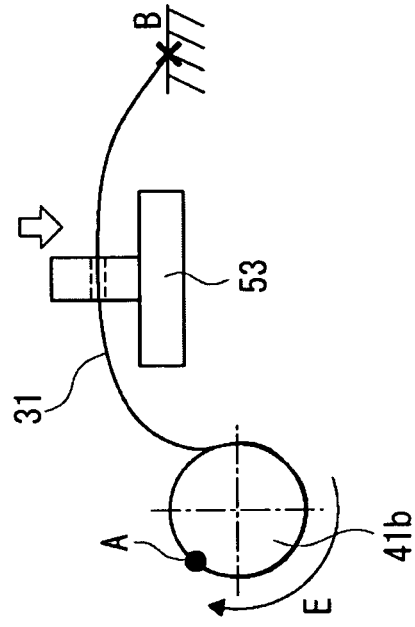
FIGS. 6A and 6B illustrate a movement of a pad caused by a change in a head circumference length of a wire.
Figure 6B:
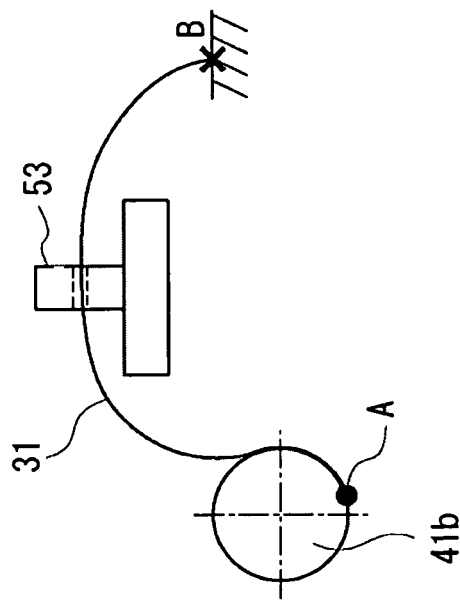

FIGS. 6A and 6B illustrate a movement of the parietal pad 53 when a user turns the adjustment dial 41. FIG. 6A illustrates a state before the user turns the adjustment dial 41, and FIG. 6B illustrates a state after the user turns the adjustment dial 41. The wire 31 is fixed at points "A" and "B".

When the user turns the adjustment dial 41 in a direction of an arrow E illustrated in FIG. 6B, the pulley 46 also turns in the E direction. The wire 31 is thus wound up, and a length of the wire 31 along the parietal circumference becomes shorter. As the parietal circumference length of the wire 31 becomes shorter, the parietal pad 53 moves in the direction of the parietal region. The wire 32 and the occipital pad 52 make a similar movement (not illustrated). That is, when the user turns the adjustment dial 41 in the E direction, the wire wind-up unit 41c also turns in the E direction. The wire 32 is thus wound up, and a length of the wire 32 along the occipital circumference becomes shorter. As the occipital circumference length becomes shorter, the occipital pad 52 moves in the direction of the head.

The turning direction in which the adjustment dial 41 winds up the wire 31 and wire 32 is not limited to the direction of the arrow E and can be in a direction opposite to the arrow E. Further, a user may select an adjustment direction and a lock direction using a mechanism that reverses the lock direction of the one-way clutch 43. Further, a mechanism which realizes the lock state by engaging a ratchet with a rack, and the free state by disengaging the ratchet from the rack can be used instead of using the one-way clutch.

Figure 7A:
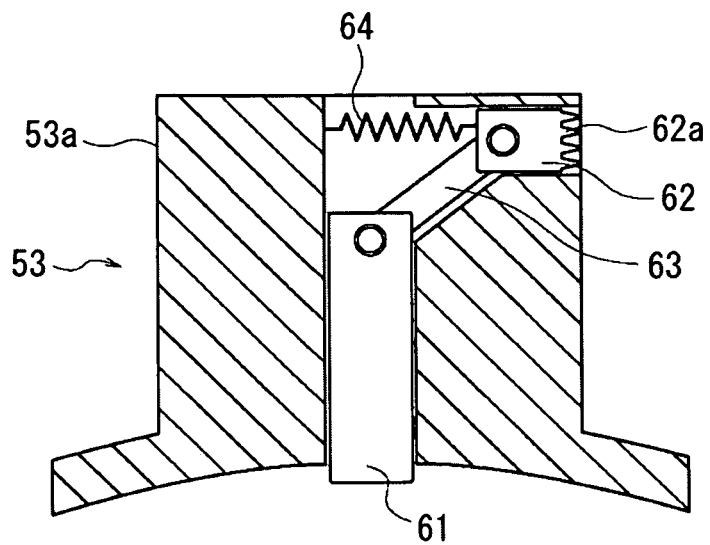
FIGS. 7A and 7B illustrate an internal configuration of a parietal pad.
Figure 7B:
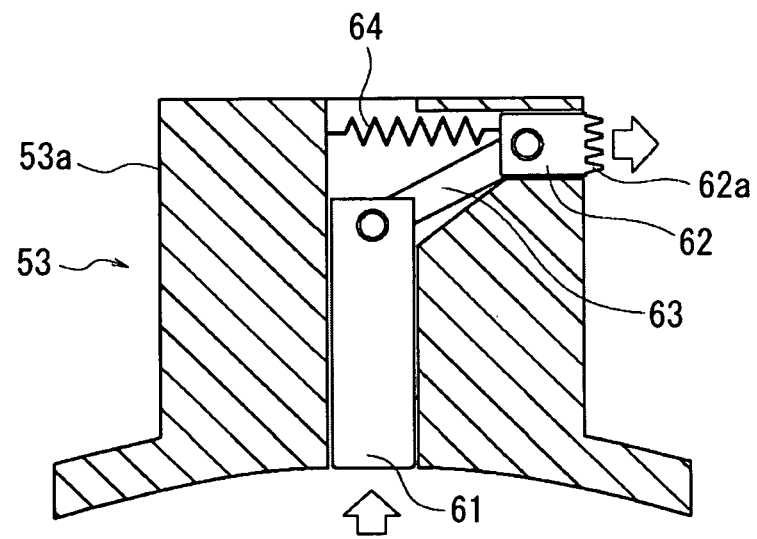

The HMD according to the present exemplary embodiment includes a parietal pad holding mechanism for holding the frame 21 and the parietal pad 53 in place when a user wears the HMD. FIGS. 7A and 7B illustrate the parietal pad holding mechanism set on the parietal pad 53.

Referring to FIGS. 7A and 7B, the parietal pad 53 internally includes a lock switch 61, a lock member 62, a link 63, and a tension spring 64. The lock switch 61 is disposed to be linearly movable in a pressing direction of the parietal region. The lock member 62 is disposed to be linearly movable in a direction different from the pressing direction of the parietal region. Further, rack-shaped teeth 62a are formed on the lock member 62. The lock switch 61 and the lock member 62 are rotatably connected each other via the link 63. Further, the tension spring 64 biases the lock member 62 in an opposite direction of the lock direction.

When the HMD is not worn, the lock switch 61 protrudes from the parietal pad 53 as illustrated in FIG. 7A. When a user wears the HMD, the user fastens the HMD with a certain pressing force, so that the parietal region of the user pushes the lock switch 61 inside and the lock member 62 is pushed out in a direction of an arrow via the link 63 as illustrated in FIG. 7B.

Figure 8A:
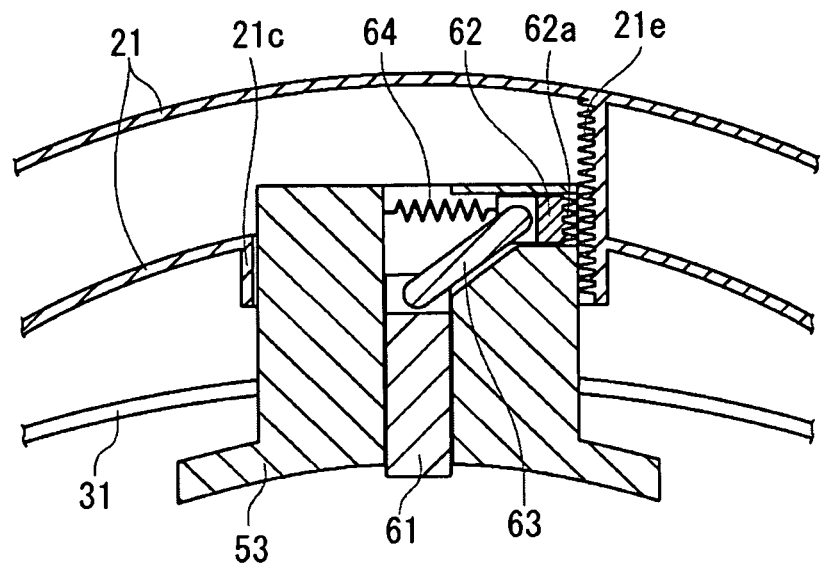
FIGS. 8A and 8B illustrate cross-sectional views of the HMD taken along a line 8-8 illustrated in FIG. 4.
Figure 8B:
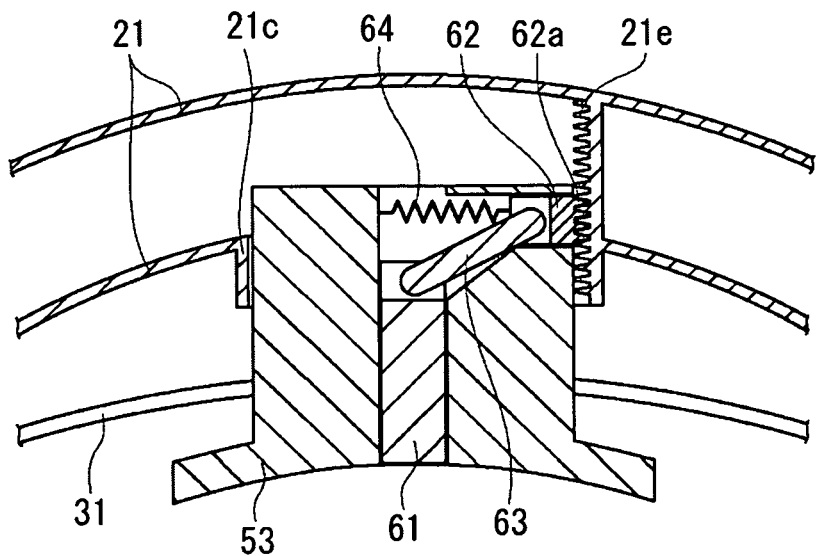

FIGS. 8A and 8B are cross-sectional views of the HMD taken along the line 8-8 illustrated in FIG. 4. FIG. 8A illustrates a state in which the lock switch 61 is not pushed inside, and FIG. 8B illustrates a state in which the lock switch 61 is pushed inside.

Referring to FIGS. 8A and 8B, teeth 21e that engage with the teeth 62a of the lock member 62 are formed on the frame 21. When the lock switch 61 is not pushed inside as illustrated in FIG. 8A, the teeth 62a and the teeth 21e are not engaged, and the parietal pad 53 moves up and down relative to the frame 21 according to the length of the wire 31. When the wire 31 becomes shorter and the parietal pad 53 presses on the head of the user, the lock switch 61 is pushed inside as illustrated in FIG. 8B. As a result, the lock member 62 is pushed out toward the frame 21, and the teeth 62a of the lock member 62 engage the teeth 21e of the frame 21, so that the position of the parietal pad 53 is retained. When the force that pushes the lock switch 61 inside is released, the tension spring 64 pulls the lock member 62 in the direction opposite to the lock direction, so that the lock switch 61 goes down.

In the present exemplary embodiment and other exemplary embodiments described below, the parietal pad holding mechanism can be used on the occipital pad by connecting a rigid frame to the occipital region of the HMD to form a configuration similar to the parietal region.

Operations and functions when a user wears the HMD according to the present exemplary embodiment will be described below.

The user grips the frame 21 on the right and left sides of the head with a left hand, and holds the adjustment dial 41 with a right hand. The user then puts the frontal pad 51 on the frontal region and adjusts the display unit 1 in a correct position. When the user determines the position, the user turns the adjustment dial 41. At this time, the user can turn the adjustment dial 41 without releasing both hands from the HMD. Consequently, a pressing member can be pressed on the head while the display unit 1 is held in the correct position.

When the user turns the adjustment dial 41, the wire 31 and the wire 32 are simultaneously wound up, so that the occipital pad 52 and the parietal pad 53 simultaneously move in the direction of the head. At this time, a diameter D1 of the pulley 46 is larger than a diameter D2 of the wire wind-up unit 41c (as illustrated in FIG. 5). Therefore, when the user turns the adjustment dial 41, the length of the wire wound up by the pulley 46 is longer than the length of the wire wound up by the wire wind-up unit 41c. Consequently, a movement amount of the parietal pad 53 becomes larger than a movement amount of the occipital pad 52.

When the user further turns the adjustment dial 41 so that the occipital pad 52 and the parietal pad 53 are both put on the head, a pressing force is generated to constrict the head. Since the above-described holding mechanism is arranged on the parietal pad 53, the parietal pad 53 is locked when a certain pressing force is applied, and the wire 31 becomes unable to be wound up.

As illustrated in FIG. 5, the torque clutch 70 is provided between the pulley 46 and the wire wind-up unit 41c. When the user turns the adjustment dial 41 to further constrict the head, a slip is generated in the torque clutch 70. Consequently, even when the parietal pad 53 is in a holding state by the above-described holding mechanism and the pulley 46 does not rotate, the wire wind-up unit 41c continues to wind up the wire 32. As a result, only the occipital pad 52 moves while the parietal pad 53 does not move, so that the occipital region can be further pressed.

The adjustment dial 41 turns only in a direction in which the wire 31 becomes shorter and is locked in the opposite direction. Therefore, the pressing force of each pressing unit is not released even if the user releases the user's hand from the adjustment dial 41 after reaching an appropriate pressing force for retaining the position of the HMD.

When the user takes off the HMD, the user pushes the release button 42 and releases the lock on the adjustment dial 41. The pressing force of the occipital pad 52 is then eased, and the force pushing the lock switch 61 is also released, so that the lock on the parietal pad 53 is released and the pressing force of the parietal pad 53 is eased.

As described above, according to the present exemplary embodiment, a user can wear the HMD while holding the display unit 1 in a correct position and pressing the head. Further, since the parietal pad 53 is provided on the HMD, a downward displacement of the display unit 1 can be reduced. Further, the user can simultaneously adjust two movable pressing units on the occipital region and the parietal region at the same time by operating on one adjustment unit 4. Therefore, the user can easily perform operations of wearing the HMD.

The parietal pad holding mechanism can also be used as the occipital pad by connecting a rigid frame also to the occipital region of the HMD to form a configuration similar to the parietal region. Further, the present exemplary embodiment supposes that the wire 31 is a metallic wire. However, a material of the wire 31 is not limited to the metal, and can be a plastic fiber such as nylon, or a special alloy which expands and contracts by a temperature change in the material. Further, in the present exemplary embodiment, a user manually turns the adjustment dial 41 and adjusts the length of the wire 31. However, the adjustment dial 41 can be electrically driven by a motor or a hydraulic actuator.

Second Exemplary Embodiment

Figure 9:
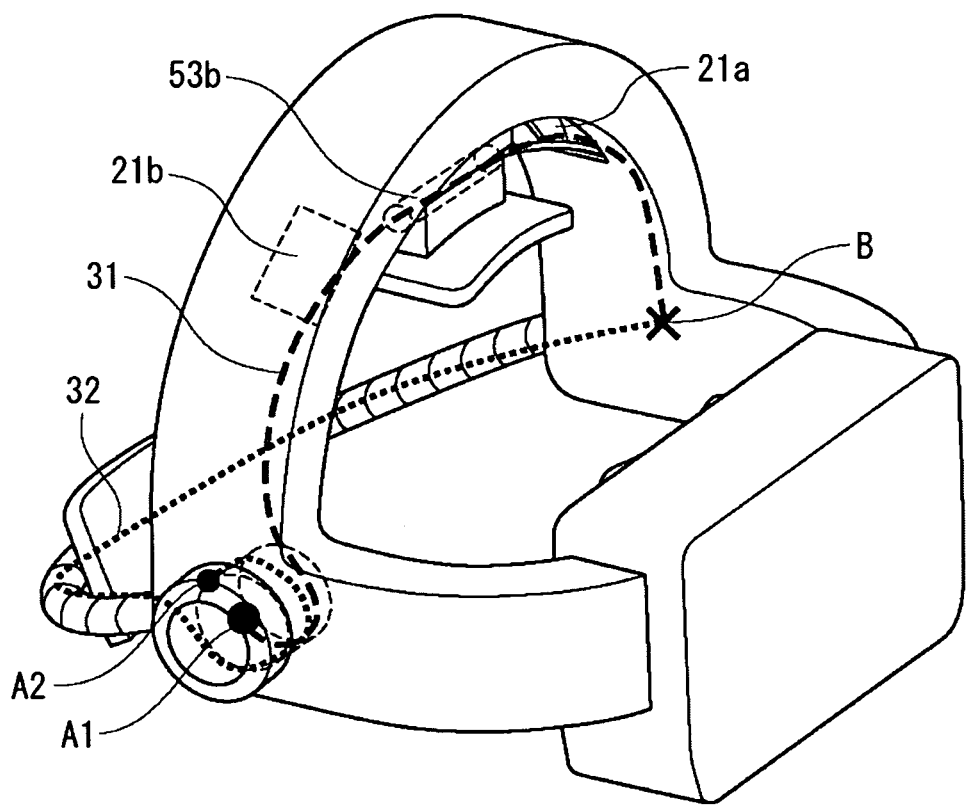
FIG. 9 illustrates a perspective view of an example HMD according to a second exemplary embodiment of the present invention.
Figure 10:
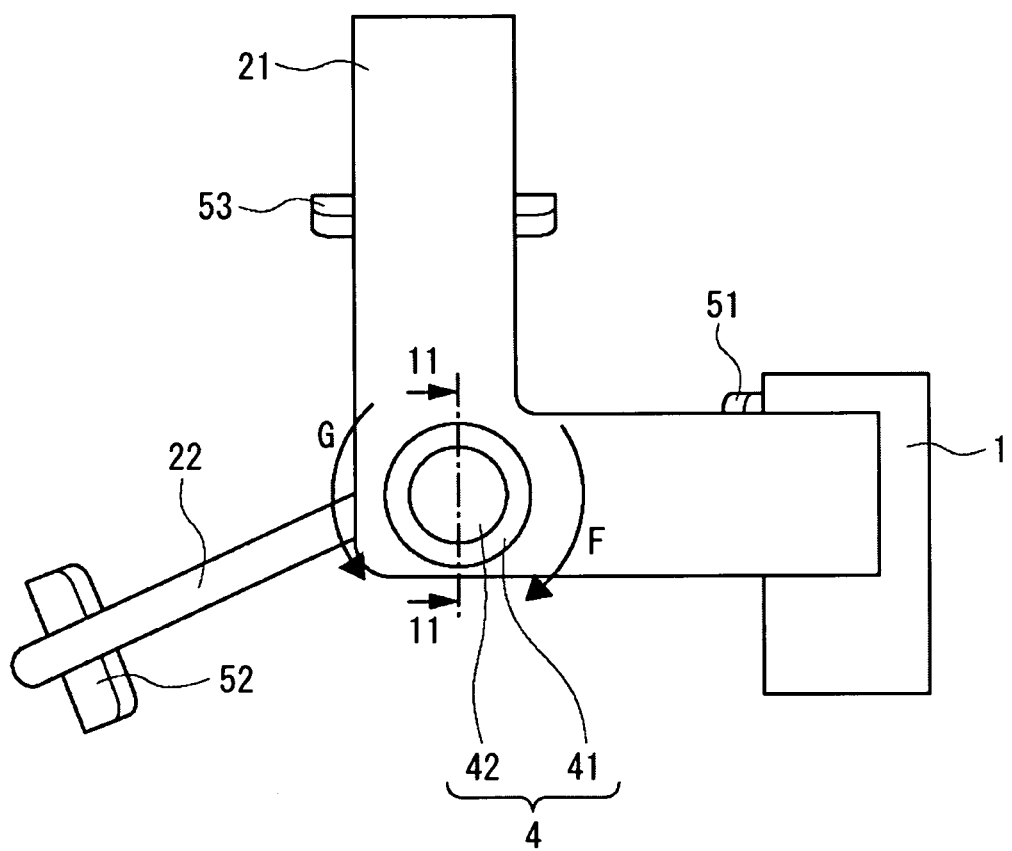
FIG. 10 illustrates a side view of the HMD according to the second exemplary embodiment of the present invention.
Figure 11:
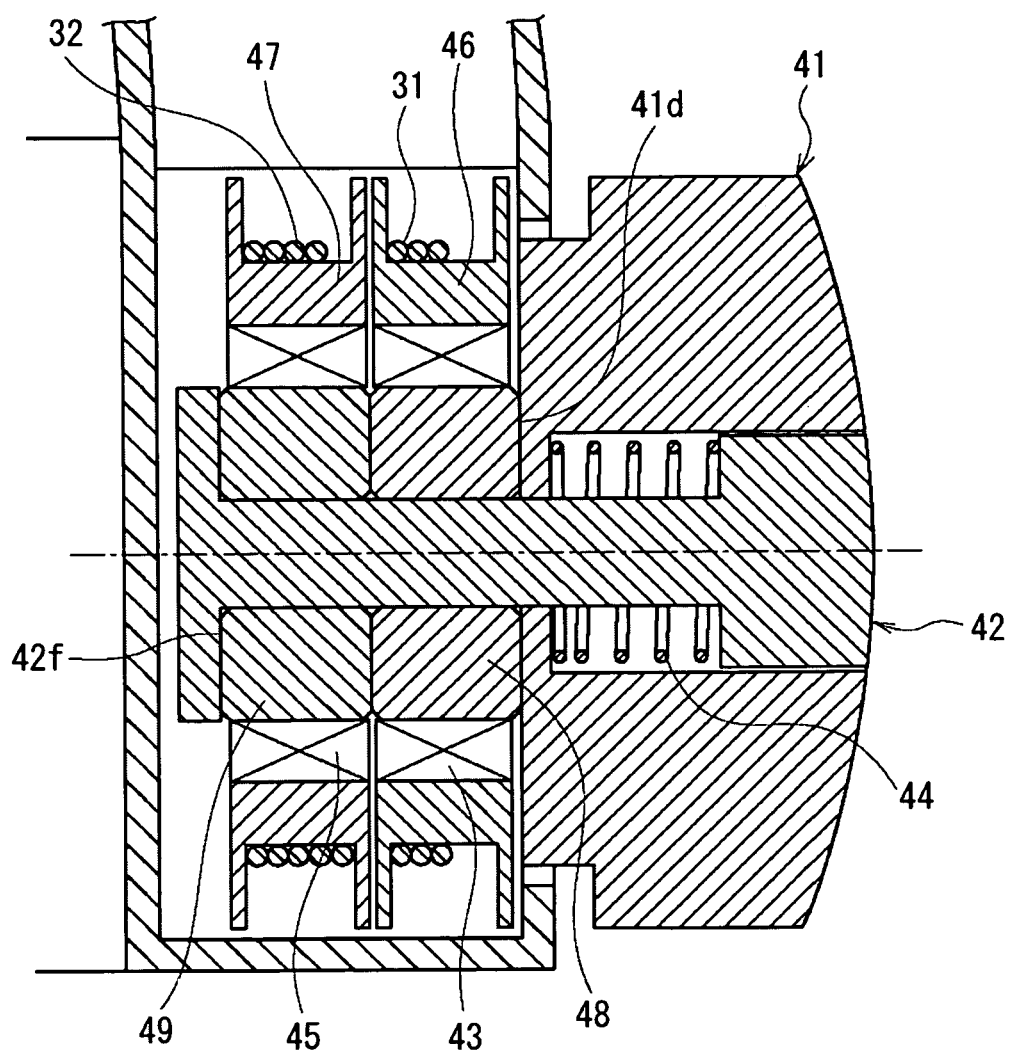
FIG. 11 illustrates a cross-sectional view of the HMD taken along a line 11-11 illustrated in FIG. 10.

FIG. 9 illustrates a perspective view of an HMD according to a second exemplary embodiment of the present invention. The turning directions for winding up the wire 31 and the wire 32 are the same in FIG. 2. FIG. 9 is different from FIG. 2 in that the turning directions are opposite in FIG. 9. FIG. 10 illustrates a side view of the HMD according to the second exemplary embodiment, and FIG. 11 illustrates a cross-sectional view of the HMD taken along the line 11-11 illustrated in FIG. 10. Same reference numerals will be used on members in the present exemplary embodiment that are similar to those described in the first exemplary embodiment, and detailed description will be omitted.

As illustrated in FIG. 11, an adjustment unit 4 in the second exemplary embodiment includes an adjustment dial 41, a release button 42, one-way clutches 43 and 45 that are rotatable in only one direction, a biasing spring 44, pulleys 46 and 47, and idle shafts 48 and 49. The one-way clutches 43 and 45 are rotatable in opposite directions.

Referring to FIG. 11, the idle shafts 48 and 49 closely contact each other and are fitted into a shaft of the release button 42. However, each of the idle shafts 48 and 49 can be axially-rotated independently. A right end of the idle shaft 48 is in contact with a back end 41d of the adjustment dial 41, and a left end of the idle shaft 49 is in contact with a disk-shaped friction unit 42f provided on an end of the release button 42. Further, the release button 42 is fitted at the center of the adjustment dial 41 to rotate freely, and the biasing spring 44 is arranged between the release button 42 and the adjustment dial 41. The idle shafts 48 and 49, the adjustment dial 41, and the release button 42 are tightly adhering to each other without space by a biasing force of the biasing spring 44. Consequently, the rotational force of the adjustment dial 41 is transmitted to the idle shafts 48 and 49.

The one-way clutches 43 and 45 are respectively pressed into outer peripheries of the idle shafts 48 and 49. Further, the pulleys 46 and 47 are respectively pressed into outer peripheries of the one-way clutches 43 and 45. The rotatable directions of the one-way clutches 43 and 45 are different, and in a case where the idle shaft 48 rotates in an F direction illustrated in FIG. 10, the one-way clutch 43 is locked, whereas the one-way clutch 45 can freely rotate.

Therefore, a rotational torque of the idle shaft 48 in the F direction is transmitted to the pulley 46. However, a rotational torque of the idle shaft 49 in the F direction is not transmitted to the pulley 47. That is, a rotational torque of the adjustment dial 41 in the F direction is transmitted only to the pulley 46 via the one-way clutch 43. As a result, the wire 31 is wound up by the pulley 46, and the length of the wire 31 of the parietal circumference (i.e., vertical circumference) becomes shorter. As the parietal circumference length of the wire 31 becomes shorter, the parietal pad 53 is moved toward the head.

On the other hand, in a case where the idle shaft 48 rotates in a direction G illustrated in FIG. 10, the one-way clutch 45 is locked while the one-way clutch 43 can freely rotate. Therefore, the rotational torque of the idle shaft 49 in the G direction is transmitted to the pulley 47. However, the rotational torque of the idle shaft 48 in the G direction is not transmitted to the pulley 46. That is, the rotational torque of the adjustment dial 41 in the G direction is transmitted only to the pulley 47 via the one-way clutch 45. As a result, the wire 32 is wound up by the pulley 47, and the length of the wire 32 of the occipital circumference becomes shorter. As the occipital circumference length of the wire 32 becomes shorter, the occipital pad 52 is moved toward the head.

Operations and functions when a user wears the HMD according to the second exemplary embodiment will be described below.

The user grips the frame 21 on the right and left sides of the head with a left hand and holds the adjustment dial 41 with a right hand. The user then puts the frontal pad 51 on the frontal region and adjusts the display unit 1 in the correct position. When the user determines the position, the user turns the adjustment dial 41 in the F direction illustrated in FIG. 10. At this time, the user can turn the adjustment dial 41 without releasing both hands from the HMD. Consequently, the pressing member can be pressed on the head while the display unit 1 is held in the correct position.

When the user operates the adjustment dial 41 as described above (i.e., turning the adjustment dial 41 in the F direction), the parietal pad 53 moves in the direction of a center of the head. When the user further turns the adjustment dial 41 and the parietal pad 53 comes in contact with the head, a pressing force is generated and the head is constricted. Since the above-described holding mechanism is arranged on the parietal pad 53, the parietal pad 53 is locked when a certain pressing force is applied, and the wire 31 cannot be wound up. The user then senses a resisting force caused by the wire 31 that cannot be wound up and thus ends the adjustment of the parietal pad 53. If the user continues to turn the adjustment dial 41 against the resisting force, a slip is generated between the idle shaft 48 and the adjustment dial 41, so that the mechanism is not damaged.

Next, the user turns the adjustment dial 41 in the G direction illustrated in FIG. 10. As in the above-described operation, the user can turn the adjustment dial 41 without releasing both hands from the HMD. Since the position of the parietal region is fixed by the above-described operation, the HMD can be more stably held. As the user turns the adjustment dial 41 in the G direction, the occipital pad 52 moves in the direction of the center of the head. When the user further turns the adjustment dial 41 and the occipital pad 52 comes in contact with the head, the pressing force is generated, and the head is constricted. The user turns the adjustment dial 41 until a desired pressing force is applied and ends constricting adjustment of the head.

When taking off the HMD, the user presses the release button 42 to release the lock on the adjustment dial 41. Consequently, the frictional force which controls the turning of the idle shafts 48 and 49 is removed, so that the idle shafts 48 and 49 can freely rotate. The pulleys 46 and 47 that wind up wires 31 and 32 respectively become freely rotatable. As a result, the pressing force on the head is released, the occipital pad 52 and the parietal pad 53 become freely movable, and the user can remove the HMD from the head.

As described above, according to the second exemplary embodiment, a user can wear the HMD while holding the display unit 1 in the correct position. Further, the parietal pad 53 can reduce a downward displacement of the display unit 1. Further, the user can alternately operate two movable pressing units at the occipital region and the parietal region by one adjustment unit. Therefore, the user can easily perform the operation of wearing the HMD.

Third Exemplary Embodiment

Figure 12:
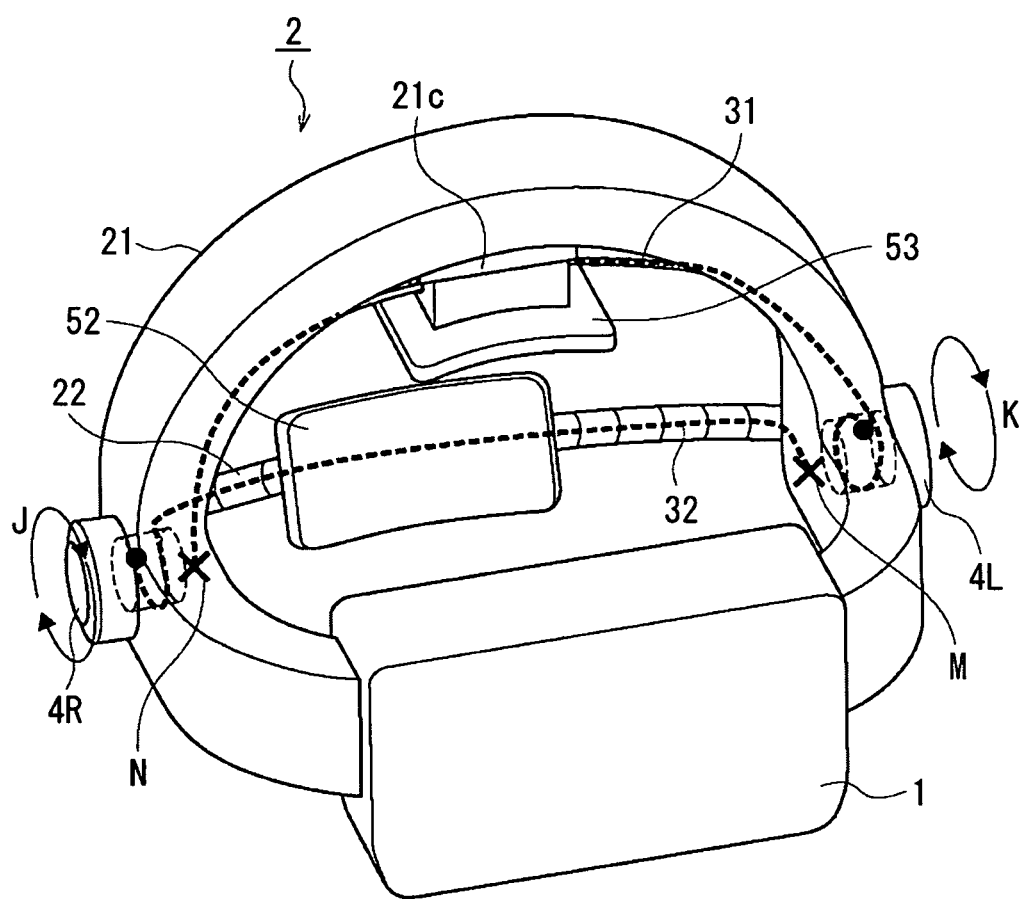
FIG. 12 illustrates a perspective view of an example HMD according to a third exemplary embodiment of the present invention.

FIG. 12 illustrates a perspective view of an HMD according to a third exemplary embodiment of the present invention.

Figure 13:
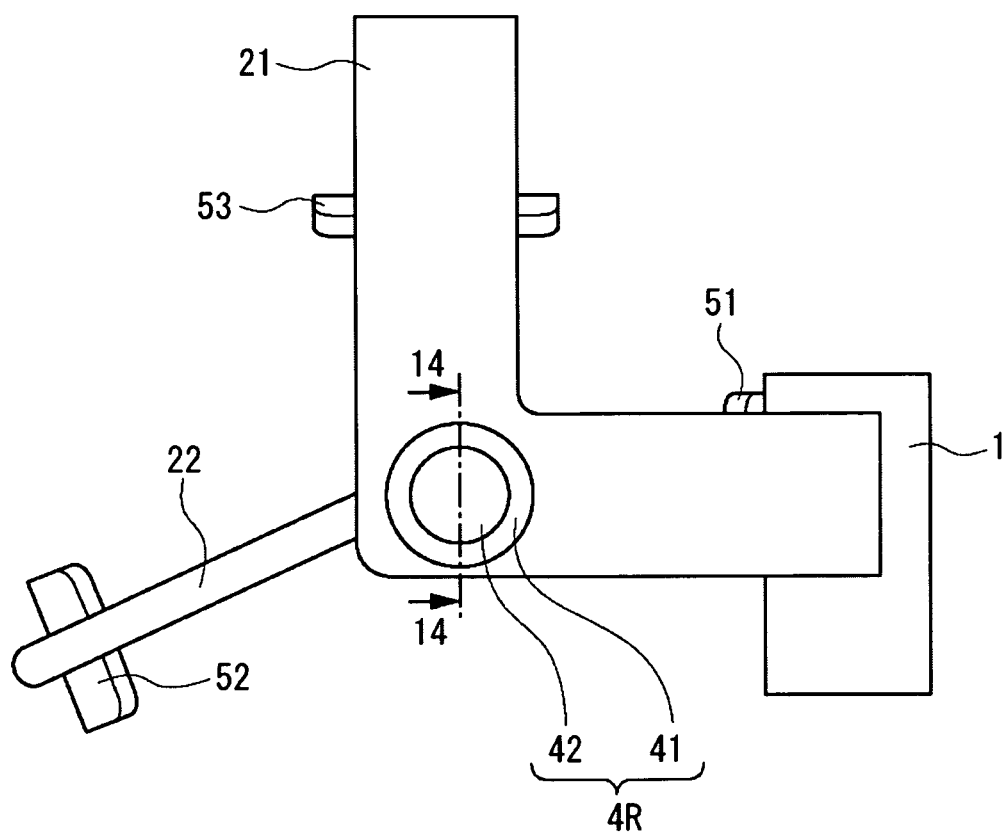
FIG. 13 illustrates a side view of the HMD according to the third exemplary embodiment of the present invention.

FIG. 13 illustrates a right side view of the HMD according to the third exemplary embodiment. Same reference numerals are assigned to members that are similar to the members in the first exemplary embodiment.

Referring to FIG. 12, in the third exemplary embodiment, a right adjustment unit 4R and a left adjustment unit 4L are respectively arranged on a right side and a left side of the frame 21. The right adjustment unit 4R and the left adjustment unit 4L are bilaterally symmetric and are formed by the same member. One end of a wire 31 is connected to an adjustment dial 41 of the left adjustment unit 4L, and the other end is connected to a connecting portion N on the right side of the frame 21. Further, one end of a wire 32 is connected to the adjustment dial 41 of the right adjustment unit R, and the other end is connected to a connecting portion M on the left side of the frame 21.

Figure 14:
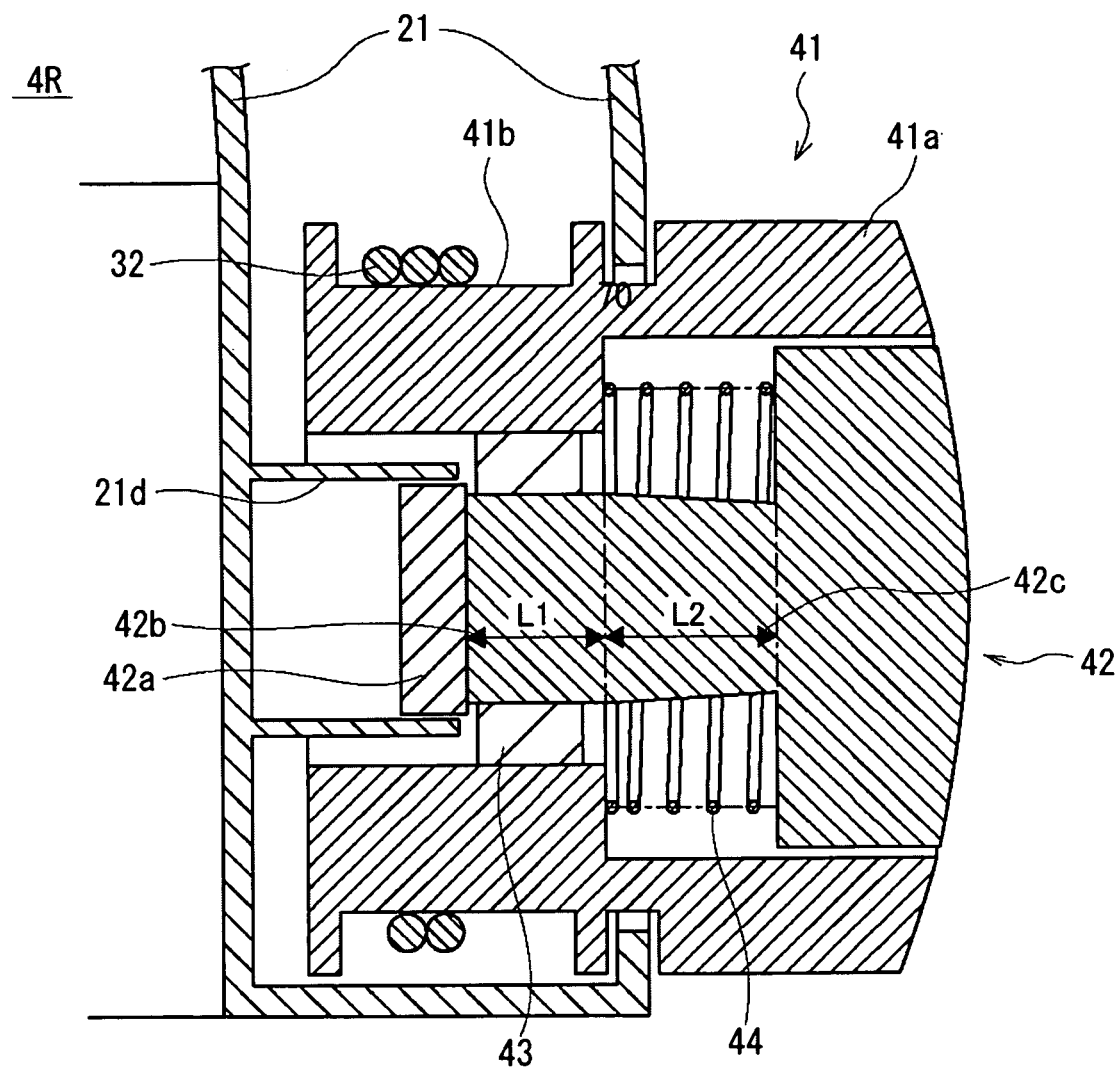
FIG. 14 illustrates a cross-sectional view of the HMD taken along a line 14-14 illustrated in FIG. 13.

Configurations of the right adjustment unit 4R and the left adjustment unit 4L are described below. FIG. 14 illustrates a cross-sectional view of the right adjustment unit 4R taken along the line 14-14 illustrated in FIG. 13 (i.e., a side view of the HMD).

Referring to FIG. 14, the right adjustment unit 4R includes the adjustment dial 41, a release button 42, a one-way clutch 43, and a biasing spring 44. The adjustment dial 41 includes a knob unit 41a that a user operates when wearing the HMD, and a wire wind-up unit 41b for winding up the wire 32 in the frame 21. The adjustment dial 41 and the one-way clutch 43 are integrated. The release button 42 includes a detent key 42a, a shaft 42b (i.e., a range L1 illustrated in FIG. 14) which is axially-fitted to the one-way clutch 43, and a taper unit 42c (i.e., a range L2 illustrated in FIG. 14) for releasing the shaft 42b from the one-way clutch 43 when the release button 42 is pressed. Since the detent key 42a of the release button 42 is engaged with the detent key groove unit 21d arranged on the frame 21, the detent key 42a does not rotate and moves only in a linear direction.

The adjustment dial 41 rotates in only one direction with respect to the release button 42 due to the one-way clutch 43 and is locked to rotate in the opposite direction. When a user presses the release button 42, the shaft 42b is released from the fitting portion of the one-way clutch 43 and enters the free state. The biasing spring 44 which biases the release button 42 in an opposite direction of the releasing direction is provided between the adjustment dial 41 and the release button 42. Consequently, when the release button 42 is not operated, the shaft 42b is fitted with the one-way clutch 43, and the locked state is maintained. Since one end of the wire 32 is connected to the adjustment dial 41 (pulley 41b), the wire 32 is wound up when the user turns the adjustment dial 41 in the locked state. A similar mechanism is configured for the left adjustment unit 4L in which the wire 31 is wound up.

Operations and functions when a user wears the HMD according to the third exemplary embodiment will be described below.

The user grips the frame 21 at the right and left sides of the head with the right hand, and holds the adjustment dial 41 of the left adjustment unit 4L with the left hand. The user then puts the frontal pad 51 on the frontal region and adjusts the display unit 1 in the correct position. When the user determines the position, the user turns the adjustment dial 41 of the left adjustment unit 4L in a K direction illustrated in FIG. 12. At this time, the user can turn the adjustment dial 41 without releasing both hands from the HMD. Consequently, the pressing member can be pressed on the head while the display unit 1 is held in the correct position.

When the user operates the adjustment dial 41 as described above, the parietal pad 53 moves in the direction of the center of the head. When the user further turns the adjustment dial 41 and the parietal pad 53 comes into contact with the head, a pressing force is generated, and the head is constricted. Since the holding mechanism described in the first exemplary embodiment is arranged on the parietal pad 53, the parietal pad 53 is locked when a certain pressing force is applied, and the wire 31 cannot be wound up. The user then senses a resisting force due to the wire 31 that cannot be wound up and thus ends the adjustment of the parietal pad 53.

The user then turns the adjustment dial 41 of the right adjustment unit 4R in a J direction illustrated in FIG. 12. As in the above-described operation, the user can turn the adjustment dial 41 without releasing both hands from the HMD. Since the position of the parietal region is fixed by the above-described operation, the HMD can be more stably held. As the user turns the adjustment dial 41 of the right adjustment unit 4R, the occipital pad 52 moves in the direction of the center of the head. When the user further turns the adjustment dial 41 and the occipital pad 52 comes into contact with the head, the pressing force is generated and the head is constricted. The user turns the adjustment dial 41 until a desired pressing force is applied and ends constricting adjustment of the head.

When taking off the HMD, the user presses the release button 42 arranged on the left adjustment unit 4L and the right adjustment unit 4R respectively to release the lock on the adjustment dial 41. Consequently, the pressing force on the occipital pad 52 and a force pressing the lock switch 61 are released, so that the lock on the parietal pad 53 is released and the pressing force of the parietal pad 53 is eased.

As described above, according to the third exemplary embodiment, the linear members are used for moving the pressing members. As a result, the mechanism of the HMD can be simplified and weight can be reduced. Therefore, the weight of the device can be reduced while a plurality of pressing units whose pressing directions are different can be adjusted.

Fourth Exemplary Embodiment

Figure 15:
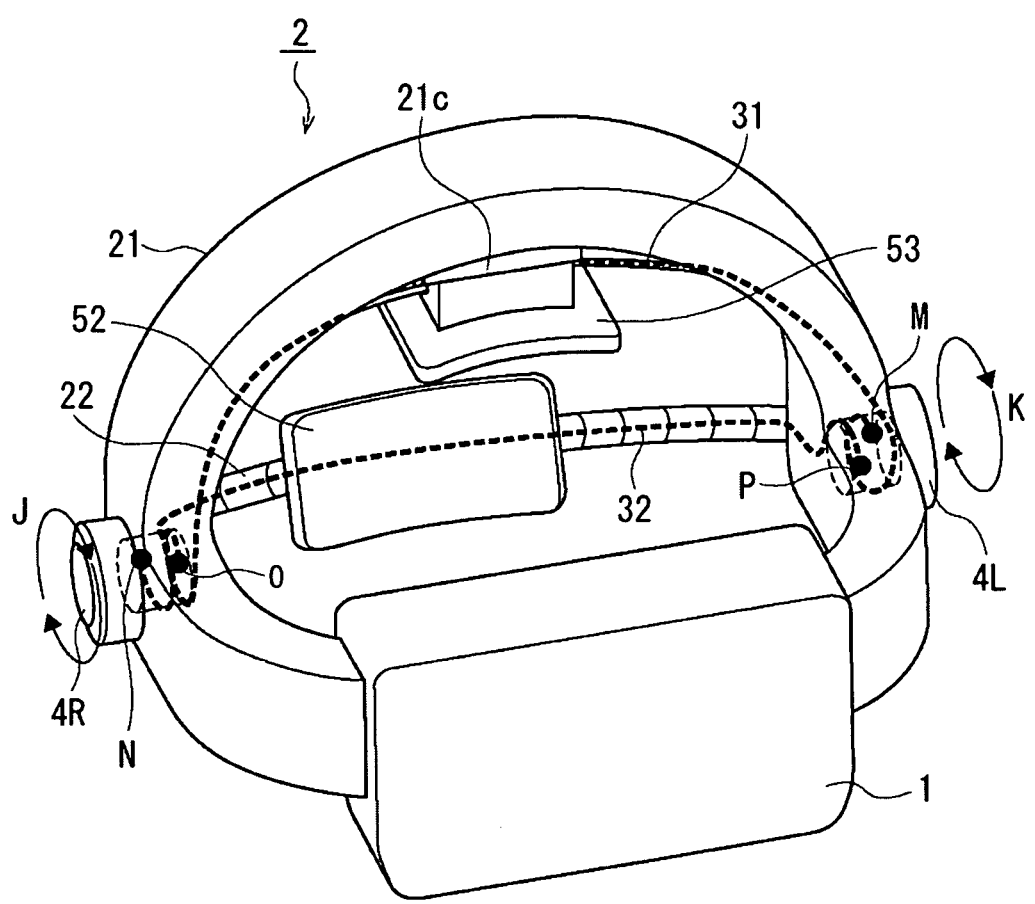
FIG. 15 illustrates a perspective view of an example HMD according to a fourth exemplary embodiment of the present invention
Figure 16A:
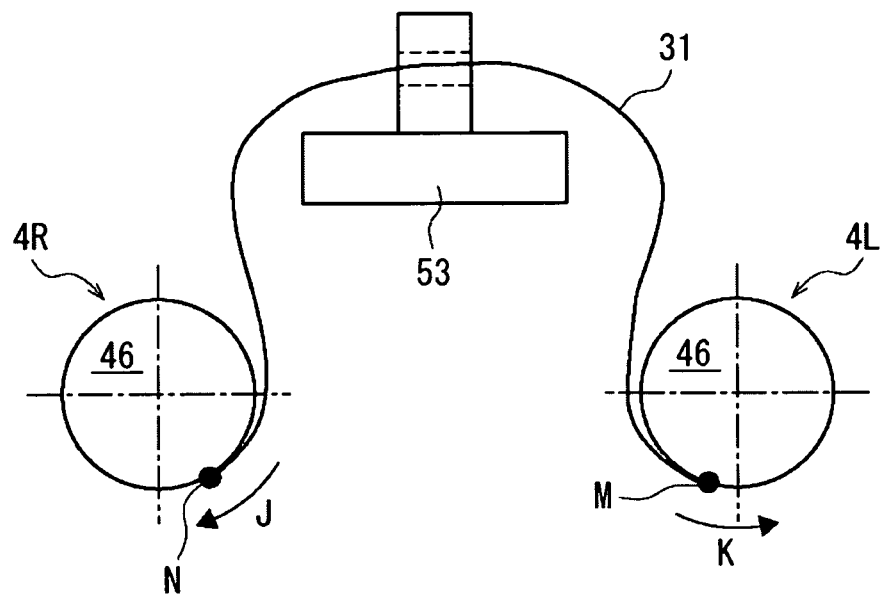
FIGS. 16A and 16B illustrate a movement of a pad caused by a change in a head circumference length of a wire according to the fourth exemplary embodiment of the present invention.
Figure 16B:
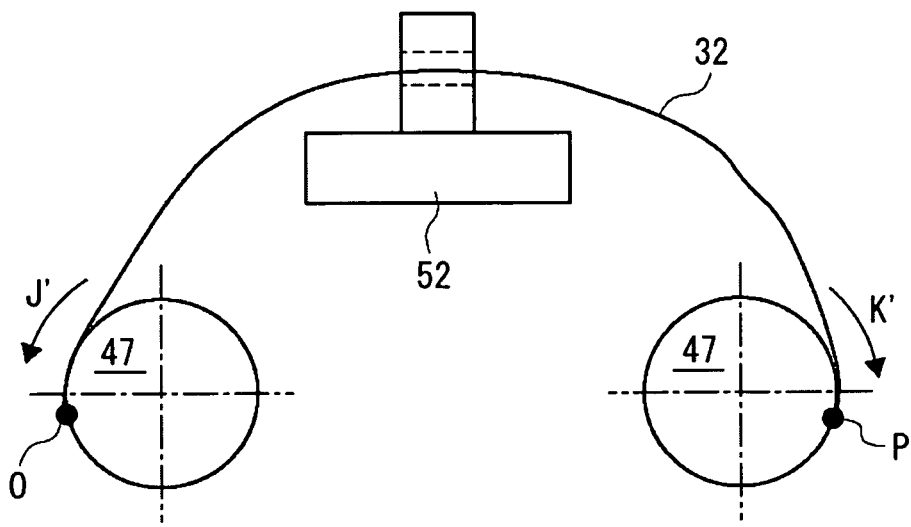

FIG. 15 illustrates a perspective view of an HMD according to a fourth exemplary embodiment of the present invention. FIGS. 16A and 16B illustrate a schematic view of a movement of the occipital pad 52 and the parietal pad 53 when a user turns the adjustment dial 41 according to the fourth exemplary embodiment.

In the fourth exemplary embodiment, the adjustment unit described in the second exemplary embodiment (illustrated in FIG. 11) is used as the left and right adjustment units 4L and 4R. Further, the occipital pad 52 and the parietal pad 53 can be adjusted by rotating the adjustment dial 41 from either of the right and left adjustment units 4R and 4L.

As illustrated in FIG. 15, one end of the wire 31 is fixed on a connecting portion N arranged on the pulley 46 of the adjustment unit 4R, and the other end is fixed on a connecting portion M arranged on the pulley 46 of the adjustment unit 4L. Similarly, one end of the wire 32 is fixed on a connecting portion O arranged on the pulley 47 of the adjustment unit 4R, and the other end is fixed on a connecting portion P arranged on the pulley 47 of the adjustment unit 4L.

Referring to FIGS. 16A and 16B, when a user turns the adjustment dial 41 of the adjustment unit 4R in the J direction or the adjustment dial 41 of the adjustment unit 4L in the K direction, the length of the wire 31 along the vertical circumference becomes shorter. Consequently, the parietal pad 53 is moved in the direction of the head. However, in a case where the user turns the adjustment dial 41 in a direction opposite to the J and K directions (i.e., J' and K' directions), a force for winding up the wire 31 is not generated due to the above-described one-way clutch 43.

On the other hand, when the user turns the adjustment dial 41 of the adjustment unit 4R in the J' direction or the adjustment dial 41 of the adjustment unit 4L in the K' direction, the length of the wire 32 along the horizontal circumference becomes shorter. Consequently, the occipital pad 52 is moved in the direction of the head. However, in a case where the user turns the adjustment dial 41 in directions opposite to the J' and K' directions (i.e., J and K directions), a force for winding up the wire 32 is not generated due to the above-described one-way clutch 43.

As described above, according to the fourth exemplary embodiment, a user can wear the HMD while holding a display unit in the correct position and pressing on the head. Since a parietal pad is arranged on the HMD, a downward displacement of the display unit can be reduced. Further, the HMD can be adjusted by either the right adjustment unit or the left adjustment unit, so that the user can use the adjustment unit that is easier to operate, and operability when a user wears the HMD increases. Further, position displacement of a pressing member whose moving direction is not restricted, such as the occipital pad 52 in the present exemplary embodiment, can be reduced by operating the left and right adjustment units 4L and 4R.

According to the above-described exemplary embodiments of the present invention, the head-mounted device to be worn on a user's head includes a plurality of pressing members configured to press the head from a plurality of different directions, and linear members connected to each pressing member. The plurality of pressing members include, for example, a first pressing member configured to press a first region of the head from a first direction, and a second pressing member configured to press a second region which is different from the first region of the head from a second direction which is different from the first direction.

In the above exemplary embodiments, an example of the first pressing member is the occipital pad 52, and an example of the second pressing member is the parietal pad 53. The occipital pad 52 presses the occipital region on the horizontal circumference along the temporal region to the occipital region. The parietal pad 53 presses the parietal region on the vertical circumference along a part of the horizontal circumference to the parietal region.

Further, the first linear member is connected to the first pressing member and the second linear member is connected to the second pressing member. The first and second linear members are guided so that a change in lengths of the first linear member and the second linear member causes the first and second pressing members to move in the first direction and the second direction respectively. In the above-described exemplary embodiments, the expansion tube 22 guides the first linear member, and the frame 21 and the holes 21a and 21b guide the second linear member.

Further, the adjustment unit 4 adjusts the lengths of the wire 31 as the first linear member and the wire 32 as the second linear member. The adjustment unit 4 includes first and second wind-up units that wind up the first linear member and the second linear member respectively using a rotational operation member (the adjustment dial 41). Examples of the first and second wind-up units are the wire wind-up unit 41c and the pulley 46 illustrated in FIG. 5, and the pulley 47 and the pulley 46 illustrated in FIG. 11. The first and second wind-up units are connected to a rotational shaft of the operation member. A torque characteristic on the rotational shaft, i.e., a transmission characteristic of a rotational force generated in the rotational shaft, is different between the first wind-up unit and the second wind-up unit.

The above-described configuration allows a user to appropriately adjust pressing operations of the plurality of pressing members whose pressing directions are different by operating a single adjustment unit 4. Therefore, a wearing operation of the HMD by the user is simplified. Further, since the linear members are used for moving the pressing members, the mechanism of the HMD can be simplified, and the weight can be reduced. That is, the plurality of pressing units whose pressing directions are different can be adjusted while reducing the weight of the device. Further, as the pressing members are moved by turning the operation member, the wearing operation of the HMD by the user is further simplified.

Since the rotational shafts of the first wind-up unit and the second wind-up unit are the same, efficiency in a spatial configuration is satisfactory, and a lightweight HMD can be provided.

A specific example of the torque characteristic with respect to the rotational shaft is described below. When the torque which is greater than or equal to the defined torque is applied between the adjustment unit 4 illustrated in FIG. 5 and a wind-up unit (i.e., the pulley 46) due to a turning of the operation member, the torque clutch 70 causes the wind-up unit to idle. Consequently, according to the above-described exemplary embodiments, pressing members are prevented from pressing the head with excessive forces when the user wears the HMD. Therefore, discomfort caused by constricting the head when the user wears the HMD is reduced.

The first and second wind-up units are the pulley 46 and the pulley 47 respectively in the adjustment unit 4 illustrated in FIG. 11. The first and second wind-up units are connected by a mechanism (i.e., one-way clutches 43 and 45) that follows one of the rotational directions of the rotational shaft extending from the release button 42 and idles in the other rotational direction of the rotational shaft. Further, the rotational direction in which the first wind-up unit follows the rotational shaft is opposite to the rotational direction in which the second wind-up unit follows the rotational shaft. By providing such configurations, the pressing members to be adjusted can be switched according to the rotational direction of the adjustment unit 4. Therefore, operability is improved, and the wearing operation of the HMD can be simplified.

In a case where the length of the wire 31 (i.e., the first linear member) is adjusted by the adjustment unit 4, the guide unit 21c arranged on the frame 21 limits the parietal pad 53 (i.e., the first pressing member) to move only up and down. As a result, a pressing force on the head by the pressing member can be controlled, and discomfort due to imbalance between the pressing forces can be reduced.

In the second exemplary embodiment, the adjustment unit 4 is arranged on each of the positions that correspond to the left and right sides of the HMD. The two ends of the first linear member (i.e., wire 31) are each connected to the first wind-up unit (i.e., pulley 46) of the two adjustment units. Similarly, the two ends of the second linear member (i.e., wire 32) are each connected to the second wind-up unit (i.e., pulley 47) of the two adjustment units. By providing such configurations, the HMD can be adjusted by either of the right adjustment unit or the left adjustment unit, so that a user can use the adjustment unit that is easier to operate and the operability when wearing the HMD is improved.

The parietal pad 53 (i.e., the first pressing member) includes the lock switch 61, the lock member 62, the link 63, and the tension spring 64, as a retaining unit configured to retain a pressing position of the parietal pad 53 according to the pressure on the parietal region. By providing such configuration, the pressing position of the pressing member can be held appropriately and the user can obtain a desired fit when the user constricts the head by each pressing member.

The adjustment unit 4 includes the first adjustment unit which adjusts the length of the first linear member and the second adjustment unit which adjusts the length of the second linear member. Since the first and second linear members have a separate adjustment unit that can be independently operated, a simple wearing mechanism can be realized. For example, the left adjustment unit 4L and the right adjustment unit 4R are disposed at positions that correspond to the left and right sides of the head of the user as the first and second adjustment units. By configuring adjustment units at the temporal region, adjustability of the pressing force is improved, and the user can easily wear the HMD.

As illustrated in FIG. 5, a wind-up diameter of the second wind-up unit (D1) is larger than the wind-up diameter of the first wind-up unit (D2) in the adjustment unit 4. The pressing force required to constrict each pressing member can be controlled by varying the diameter of the rotational mechanism that winds up the linear member and the moving amounts of the pressing members to be adjusted. As a result, the head can be more appropriately constricted, and the HMD which is comfortable to wear can be provided.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-234712 filed Sep. 10, 2007, which is hereby incorporated by reference herein in its entirety.

What is claimed is:

1. A head-mounted device to be worn on a head of a user comprising:
    a first pressing member configured to press a first region of the head from a first direction;
    a second pressing member configured to press a second region which is different from the first region of the head from a second direction which is different from the first direction;
    a first linear member connected to the first pressing member;
    a second linear member connected to the second pressing member;
    a guiding member configured to guide the first linear member and the second linear member so that a change in lengths of the first linear member and the second linear member causes the first pressing member and the second pressing member to move in the first direction and the second direction respectively; and
    an adjustment unit configured to adjust the lengths of the first linear member and the second linear member,
    wherein the adjustment unit includes first and second wind-up units connected to a rotational operation member and configured to wind up the first linear member and the second linear member,
    wherein a transmission characteristic of a rotational force from a rotational shaft of the operation member is different between a connection of the first wind-up unit with the rotational shaft and a connection of the second wind-up unit with the rotational shaft,
    wherein the adjustment unit adjusts the lengths of both the first linear member and the second linear member in accordance with one rotating direction of the rotational operation member,
    wherein the first region pressed by the first pressing member is a region on a horizontal circumference of the head extending from a temporal region to an occipital region of the head, and
    wherein the second region pressed by the second pressing member is a region on a vertical circumference of the head extending from one portion of the horizontal circumference to a parietal region of the head.

2. The head-mounted device according to claim 1, wherein the second wind-up unit includes a mechanism which idles the second wind-up unit with respect to the rotational shaft when a torque between the second wind-up unit and the rotational shaft becomes greater than or equal to a defined torque.

3. The head-mounted device according to claim 1, wherein the first and second wind-up units are connected with each other by a mechanism that follows one rotational direction of the rotational shaft and idles with respect to the other rotational direction, and
    wherein the rotational direction in which the first wind-up unit follows the rotational shaft and the rotational direction in which the second wind-up unit follows the rotational shaft are in opposite directions.

4. The head-mounted device according to claim 3, wherein the adjustment units are arranged at positions that each correspond to left and right temporal regions of the head-mounted device,
    an end of the first linear member is connected to the first wind-up unit in each of the adjustment units, and
    an end of the second linear member is connected to the second wind-up unit in each of the adjustment units.

5. The head-mounted device according to claim 1, further comprising a restraining unit configured to restrain a movement of the second pressing member in a different direction from the second direction when the adjustment unit adjusts the length of the second linear member.

6. The head-mounted device according to claim 1, further comprising a retaining unit configured to retain a position of the second pressing member according to a pressure on the second region by the second pressing member.

7. The head-mounted device according to claim 2, wherein a wind-up diameter of the second wind-up unit is larger than a wind-up diameter of the first wind-up unit.

8. A head-mounted device to be worn on a head of a user comprising:
    a first pressing member configured to press a first region of the head from a first direction;
    a second pressing member configured to press a second region which is different from the first region of the head from a second direction which is different from the first direction;
    a first linear member connected to the first pressing member;
    a second linear member connected to the second pressing member;
    a guiding member configured to guide the first linear member and the second linear member so that a change in lengths of the first linear member and the second linear member causes the first pressing member and the second pressing member to move in the first direction and the second direction respectively; and
    an adjustment unit configured to adjust the lengths of the first linear member and the second linear member,
    wherein the adjustment unit includes first and second wind-up units connected to a rotational operation member and configured to wind up the first linear member and the second linear member, and wherein the adjustment unit adjusts the lengths of both the first linear member and the second linear member in accordance with one rotating direction of the rotational operation member, wherein the first region pressed by the first pressing member is a region on a horizontal circumference of the head extending from a temporal region to an occipital region of the head, and wherein the second region pressed by the second pressing member is a region on a vertical circumference of the head extending from one portion of the horizontal circumference to a parietal region of the head.

9. The head-mounted device according to claim 8, further comprising a restraining unit configured to restrain a movement of the second pressing member in a different direction from the second direction when the adjustment unit adjusts the length of the second linear member.

10. The head-mounted device according to claim 8, further comprising a retaining unit configured to retain a position of the second pressing member according to a pressure on the second region by the second pressing member.

11. A head-mounted device to be worn on a head of a user comprising:
   a first pressing member configured to press a first region of the head from a first direction;
   a second pressing member configured to press a second region which is different from the first region of the head from a second direction which is different from the first direction;
   a first linear member connected to the first pressing member;
   a second linear member connected to the second pressing member;
   a guiding member configured to guide the first linear member and the second linear member so that a change in lengths of the first linear member and the second linear member causes the first pressing member and the second pressing member to move in the first direction and the second direction respectively; and
   an adjustment unit configured to adjust the lengths of the first linear member and the second linear member,
   wherein the adjustment unit includes first and second wind-up units connected to a rotational operation member and configured to wind up the first linear member and the second linear member,
   wherein a transmission characteristic of a rotational force from a rotational shaft of the operation member is different between a connection of the first wind-up unit with the rotational shaft and a connection of the second wind-up unit with the rotational shaft, and
   wherein the adjustment unit adjusts the lengths of both the first linear member and the second linear member in accordance with one rotating direction of the rotational operation member,
   wherein the second wind-up unit includes a mechanism which idles the second wind-up unit with respect to the rotational shaft when a torque between the second wind-up unit and the rotational shaft becomes greater than or equal to a defined torque, and
   wherein a wind-up diameter of the second wind-up unit is larger than a wind-up diameter of the first wind-up unit.

12. The head-mounted device according to claim 11,
   wherein the first and second wind-up units are connected with each other by a mechanism that follows one rotational direction of the rotational shaft and idles with respect to the other rotational direction, and
   wherein the rotational direction in which the first wind-up unit follows the rotational shaft and the rotational direction in which the second wind-up unit follows the rotational shaft are in opposite directions.

13. The head-mounted device according to claim 12, wherein the adjustment units are arranged at positions that each correspond to left and right temporal regions of the head-mounted device,
   wherein an end of the first linear member is connected to the first wind-up unit in each of the adjustment units, and
   wherein an end of the second linear member is connected to the second wind-up unit in each of the adjustment units.

14. The head-mounted device according to claim 11, further comprising a restraining unit configured to restrain a movement of the second pressing member in a different direction from the second direction when the adjustment unit adjusts the length of the second linear member.

15. The head-mounted device according to claim 11, further comprising a retaining unit configured to retain a position of the second pressing member according to a pressure on the second region by the second pressing member.

* * * * *